Patented Oct. 15, 1929

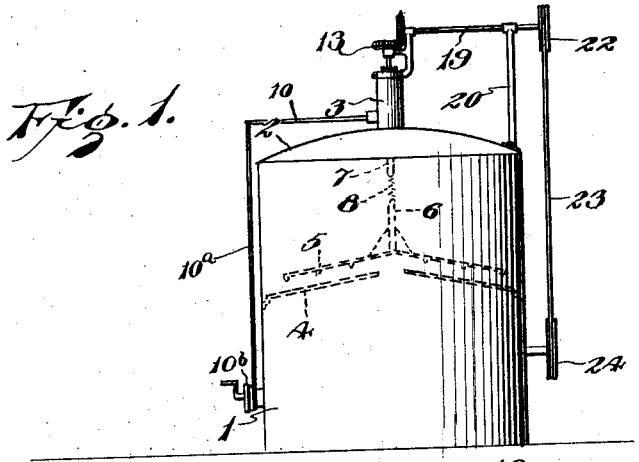
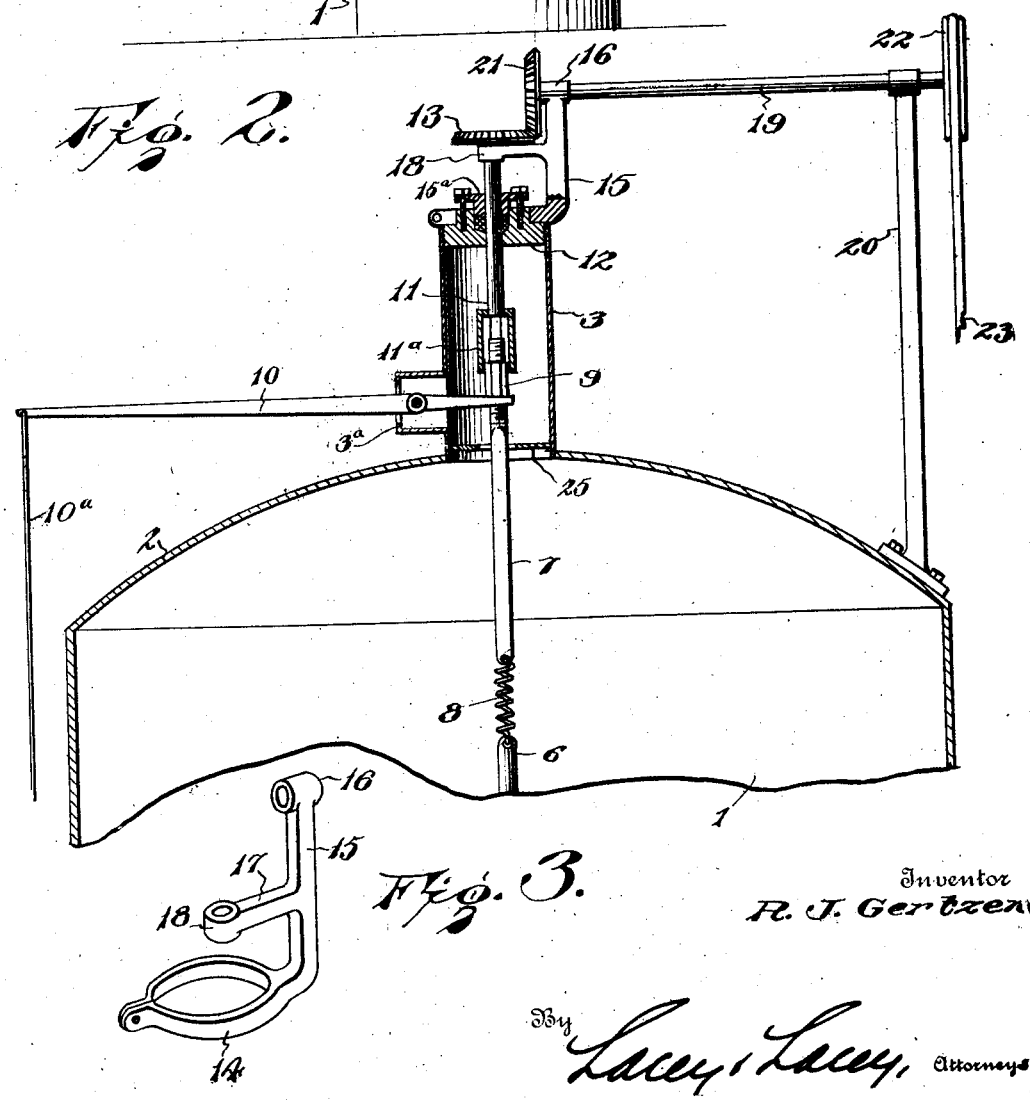

1,731,620

UNITED STATES PATENT OFFICE

RICHARD J. GERTZEN, OF OILMONT, MONTANA

ELECTRODE-ADJUSTING MECHANISM FOR DEHYDRATORS

Application filed May 15, 1928. Serial No. 277,975.

The water is generally removed from crude oil by the flow of an electric current of high voltage between two electrodes, one of which is fixed and the other adjustable.

The dehydrating process is usually carried out in a tank having a rounded top and is hazardous because of the high voltage current employed and because of the uncertain footing obtainable upon the top of the tank which, most of the time, is covered with oil.

The present invention obviates the necessity of mounting the top of the tank and admits of adjusting the movable electrode from the floor or ground, thereby facilitating the work and materially reducing the risk from falling and sustaining an electric shock.

While the drawing illustrates a preferred embodiment of the invention, it is to be understood that in adapting the means to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is an elevational view of a tank for dehydrating crude oil provided with means for adjusting the movable electrode embodying the invention.

Figure 2 is an enlarged sectional view showing the electrode adjusting means more clearly.

Figure 3 is a perspective view of the bearing bracket.

Corresponding and like parts are referred to in the following description and designated in the several views of the drawing by like reference characters.

The numeral 1 denotes a tank such as generally used for dehydrating crude oil. The numeral 2 designates the rounded top of the tank and 3 represents a tubular extension projecting upwardly from the center of the top 2. The fixed electrode within the tank is indicated by the numeral 4 and the movable electrode by the numeral 5. A stem 6 projects vertically from the center of the movable electrode 5, and is yieldably connected to a stem 7 by means of a spring 8. The upper portion of the stem 7 is threaded and receives a nut 9.

A bracket or extension 3ª projects outwardly from a side of the tubular extension 3 and receives the inner portion of a lever 10 which is pivoted therein, the inner extremity of the lever fitting loosely about the stem 7 and a cord or cable 10ª connecting the outer end of the lever with a windlass 10ᵇ readily accessible from the ground. The nut 9 threaded upon the stem 7 rests upon the inner end of the lever 10 and when rotated effects a vertical movement of the stem 7 and a corresponding adjustment of the electrode 5. A stem 11 is provided at its lower end with a socket 11ª which slidably receives the nut 9. A plug 12 closes the upper end of the tubular extension 3 and the stem 11 is mounted therein, a close joint between the stem 11 and plug 12 being maintained by means of a stuffing box 15ª.

The upper portion of the stem 11 is mounted in the plug 12 and its projecting end has a bevel gear 13 fast thereto. The upper portion of the plug 12 is reduced and receives a clamp 14 from which a standard 15 projects vertically and terminates in a bearing 16. An arm 17 projects laterally from the standard 15 and terminates in a bearing 18 in which the upper end of the stem 11 is journaled. A horizontal shaft 19 is journaled in the bearing 16 and in a bearing provided at the upper end of a standard 20 secured to the tank 1. A bevel gear 21 fast to the inner end of the shaft 19 is in mesh with the bevel gear 13. A pulley 22 fast to the outer end of the shaft 19 is connected by means of a belt 23 with a pulley 24 upon the side of the tank 1 adjacent the lower end thereof, thereby admitting of the belt 23 being readily accessible from the floor or ground for operation.

It will be readily understood from the foregoing, taken in connection with the accompanying drawing that the movable electrode 5 may be readily adjusted from the floor without necessitating mounting of the tank, and incurring the risk incident to one standing upon the top of the tank to effect adjustment of the movable electrode.

The lower portion of the stem 7 is flat and passes through a slot formed in a cross-piece 25 at the lower end of the tube 3 so that the stem will not rotate and consequently will be caused to move up or down when the nut is rotated. The nut 9 and socket 11$^a$ provide for adjustment of the upper electrode to a proper working position but it may be necessary at times to agitate the contents of the tank and for this purpose the lever 10 and cable 10$^a$ are brought into use in an obvious manner, the nut 9 sliding in the socket 11$^a$ while vertically reciprocating.

Having thus described the invention, I claim:

1. The combination with a tank for dehydrating crude oil, and fixed and movable electrodes therein, of means for adjusting the movable electrode from the floor without necessitating mounting of the tank, said means including a vertical stem having connection with the movable electrode, a horizontal shaft geared to the stem and means for rotating the horizontal shaft from the floor.

2. The combination with a tank for dehydrating crude oil, and fixed and movable electrodes therein, of means for adjusting the movable electrode from the floor without necessitating mounting of the tank, said means including a vertical stem having yieldable connection with the movable electrode, a horizontal shaft geared to the vertical stem, and means for rotating the horizontal shaft from the floor.

3. The combination with a tank for dehydrating crude oil, and fixed and movable electrodes therein, of means for adjusting the movable electrode from the floor without necessitating mounting of the tank, said means including a tubular extension rising from the top of the tank, a plug closing the upper end of the tubular extension and having a reduced portion, a clamp fitted to the reduced part of the plug and having a standard rising therefrom, a stem mounted in the plug, a horizontal shaft geared to the stem, and means for rotating the horizontal shaft from the floor.

4. The combination with a tank for dehydrating crude oil, and fixed and movable electrodes therein, of means for adjusting the movable electrode from the floor without necessitating mounting of the tank, said means including a stem, a nut threaded upon the stem, a second stem provided with a socket engaging the nut, a horizontal shaft geared to the said second stem, and means for operating the horizontal shaft from the floor.

In testimony whereof I affix my signature.

RICHARD J. GERTZEN.